United States Patent
Mok (10) Patent No.: US 10,804,825 B2
(45) Date of Patent: Oct. 13, 2020

(54) AUTOMATIC ADVANCE ANGLE CONTROL SYSTEM AND METHOD FOR BRUSHLESS LINEAR DIRECT CURRENT MOTOR

(71) Applicant: Pusan National University Industry-University Cooperation Foundation, Busan (KR)

(72) Inventor: Kim Jang Mok, Busan (KR)

(73) Assignee: PUSAN NATIONAL UNIVERSITY INDUSTRY-UNIVERSITY COOPERATION FOUNDATION, Busan (KR)

( * ) Notice: Subject to any disclaimer, the term of this patent is extended or adjusted under 35 U.S.C. 154(b) by 0 days.

(21) Appl. No.: 16/420,921

(22) Filed: May 23, 2019

(65) Prior Publication Data

US 2019/0363653 A1 Nov. 28, 2019

(30) Foreign Application Priority Data

May 23, 2018 (KR) .................. 10-2018-0058515

(51) Int. Cl.
  *H02P 7/293* (2016.01)
  *H02P 7/02* (2016.01)
  *H02P 7/29* (2016.01)
(52) U.S. Cl.
  CPC ............ *H02P 7/293* (2016.02); *H02P 7/02* (2016.02); *H02P 7/29* (2013.01)
(58) Field of Classification Search
  CPC ........................................................ H02P 6/08
  See application file for complete search history.

(56) References Cited

U.S. PATENT DOCUMENTS

| | | | |
|---|---|---|---|
| 2015/0076275 A1* | 3/2015 | Bonanni | B65H 54/2854 242/478.2 |
| 2015/0333681 A1* | 11/2015 | Matsuki | H02P 21/0085 318/400.02 |
| 2019/0351939 A1* | 11/2019 | Pramod | H02P 21/0003 |

FOREIGN PATENT DOCUMENTS

KR   10-2018-058515   5/2018

* cited by examiner

*Primary Examiner* — Eduardo Colon Santana
*Assistant Examiner* — Said Bouziane
(74) *Attorney, Agent, or Firm* — Alston & Bird LLP

(57) ABSTRACT

Provided are an automatic advance angle control system and method for a brushless linear direct current (BLDC) motor. The automatic advance angle control system for the BLDC motor includes a current controller configured to generate an anti-windup output for compensating for accumulated errors of an output voltage provided to the BLDC motor; a voltage headroom calculator configured to generate a voltage headroom from a counter-electromotive force and the output voltage provided to the BLDC motor; and an advance angle controller configured to generate an advance angle for controlling a phase of a phase current of the BLDC motor by performing proportional integration on a difference between the anti-windup output and the voltage headroom when the anti-windup output is generated and configured to ignore the generation of the advance angle when the anti-windup output is not generated.

6 Claims, 7 Drawing Sheets

AUTOMATIC ADVANCE ANGLE CONTROL SYSTEM AND METHOD FOR BRUSHLESS LINEAR DIRECT CURRENT MOTOR

This application claims priority from Korean Patent Application No. 10-2018-0058515 filed on May 23, 2018 in the Korean Intellectual Property Office, the disclosure of which is incorporated herein by reference in its entirety.

BACKGROUND

1. Field of the Disclosure

The present disclosure relates to an automatic advance angle control system and method for a brushless linear direct current motor.

2. Description of the Related Art

Generally, a brushless direct current (BLDC) motor is an electrically driven motor, which is a DC motor from which mechanical contact parts such as a brush and a commutator are removed.

Figure 1:
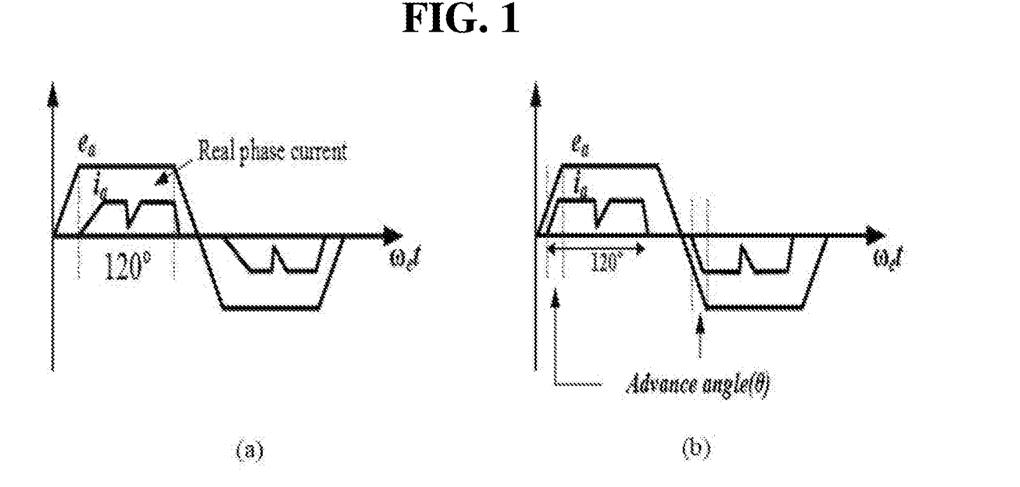
FIG. 1 shows graphs illustrating operation of a brushless linear direct current (BLDC) motor.

FIG. 1 shows graphs illustrating operation of a BLDC motor.

Referring to FIG. 1(a), the BLDC motor generates electrical torque by the product of a quasi-trapezoidal counter-electromotive force $e_a$ and a quasi-square wave-shaped phase current $i_a$. That is, an ideal BLDC motor can uniformly generate torque by applying a square wave-shaped phase current $i_a$ to a trapezoidal counter-electromotive force $e_a$ with a phase different of 120 degrees.

The electric torque generated by the BLDC motor may have current delay due to an increase in reactance of a phase winding in a high-speed operation region. The delay of the phase current $i_b$ may cause a torque ripple. To remove the torque ripple, as shown in FIG. 1(b), the BLDC motor may perform advance angle control to advance the phase of the phase current $i_a$ relative to the phase of the counter-electromotive force $e_a$.

The advance angle control may use a lookup table in which advance angles of current are stored or a component for connecting a circuit of an advance angle compensator to an output end of a hall sensor to output a signal in the vicinity of the bandwidth of the compensator to lead an input.

SUMMARY

For advance angle control using a lookup table, it is necessary to accurately know the rated output, rated rotational speed and maximum rotational speed of a motor. Also, in order to know the above values, it is necessary to actually drive the motor. When an operating point is changed due to a change in operating temperature of the motor, the advance angle control may not be correct.

Also, when an additional circuit connected to a hall sensor is used, it is necessary to accurately determine when an advance angle is applied, and the volume and cost of the entire motor system increase due to the need for additional circuitry.

It is an object of the present disclosure to provide an automatic advance angle control system for a brushless linear direct current (BLDC) motor which efficiently operates in a high-speed operation region through automatic advance angle control without using a lookup table or an additional circuit.

It is another object of the present disclosure to provide an automatic advance angle control method for a BLDC motor which efficiently operates in a high-speed operation region through automatic advance angle control without using a lookup table or an additional circuit.

It should be noted that objects of the present disclosure are not limited to the above-described objects, and other objects of the present disclosure will be apparent to those skilled in the art from the following descriptions.

Aspects of the present disclosure provide an automatic advance angle control method for a brushless linear direct current (BLDC) motor, the automatic advance angle control method including receiving a phase current and a counter-electromotive force provided to the BLDC motor and generating a voltage headroom; monitoring whether an anti-windup output is generated to compensate for accumulated errors of the BLDC motor; and generating an advance angle using a command indicating whether the anti-windup output is generated, independently of a magnitude relationship between the voltage headroom and the anti-windup output, wherein the advance angle is generated by using the anti-windup output minus the voltage headroom as an input of an advance angle controller, when the anti-windup output is generated and ignoring the generation of the advance angle when the anti-windup output is not generated.

Aspects of the present disclosure also provide an automatic advance angle control system for a BLDC motor, the automatic advance angle control system including a current controller configured to generate an anti-windup output for compensating for accumulated errors of an output voltage provided to the BLDC motor; a voltage headroom calculator configured to generate a voltage headroom from a counter-electromotive force and the output voltage provided to the BLDC motor; and an advance angle controller configured to generate an advance angle for controlling a phase of a phase current of the BLDC motor using a command indicating whether the anti-windup output is generated, independently of a magnitude relationship between the voltage headroom and the anti-windup output, wherein the advance angle is generated by using the anti-windup output minus the voltage headroom as an input, when the anti-windup output is generated and configured to ignore the generation of the advance angle when the anti-windup output is not generated.

BRIEF DESCRIPTION OF THE DRAWINGS

The above and other aspects and features of the present disclosure will become more apparent by describing in detail exemplary embodiments thereof with reference to the attached drawings, in which.

DETAILED DESCRIPTION OF THE EMBODIMENTS

Advantages and features of the present disclosure and methods of accomplishing the same will be apparent by referring to embodiments described below in detail in connection with the accompanying drawings. The disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. Therefore, the scope of the disclosure is defined only by the appended claims. The size and relative size of the constituent elements marked in the drawings may be exaggerated for clarity of description. Like reference numerals refer to like elements throughout the specification, and the term "and/or" includes any and all combinations of one or more of the associated listed items.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. The terms "comprises" and/or "comprising" used herein specify the presence of stated elements, but do not preclude the presence or addition of one or more other elements.

Although the terms first, second, etc. may be used herein to describe various devices or elements, it will be appreciated that these devices or elements should not be limited by these terms. These terms are used only to distinguish one device or element from another device or element. Thus, it will be appreciated that a first device or element discussed below could be termed a second device or element without departing from the teachings of the present disclosure.

Unless otherwise defined, all terms (including technical and scientific terms) used herein have the same meaning as commonly understood by one of ordinary skill in the art to which this disclosure belongs. It should be further understood that terms, such as those defined in commonly used dictionaries, should be interpreted as having a meaning that is consistent with their meaning in the context of the relevant art and are not to be interpreted in an idealized or overly formal sense unless expressly so defined herein.

The voltage equation of a BLDC motor may be expressed by Equation 1 below:

$$V_{abcs} = R_s i_{abcs} + L_s \frac{di_{abcs}}{dt} + e_{abcs} \quad \text{[Equation 1]}$$

where $V_{abcs}$ is a phase voltage, $i_{abcs}$ is a phase current, $e_{abcs}$ is a phase counter electromotive force. $R_s$ is stator resistance, and $L_s$ is stator inductance.

Also, the mechanical output and generated torque of the motor may be expressed by Equations 2 and 3 below:

$$P = e_a i_a + e_b i_b + e_c i_c = T_e \omega_m \quad \text{[Equation 2]}$$

$$T_e = J_m \frac{d\omega_m}{dt} + B_m \omega_m + T_L \quad \text{[Equation 3]}$$

where P is an output, $T_e$ is a torque, $\omega_m$ is a rotational speed, $J_m$ is a moment of inertia, and $B_m$ is a viscous friction coefficient.

Figure 2:
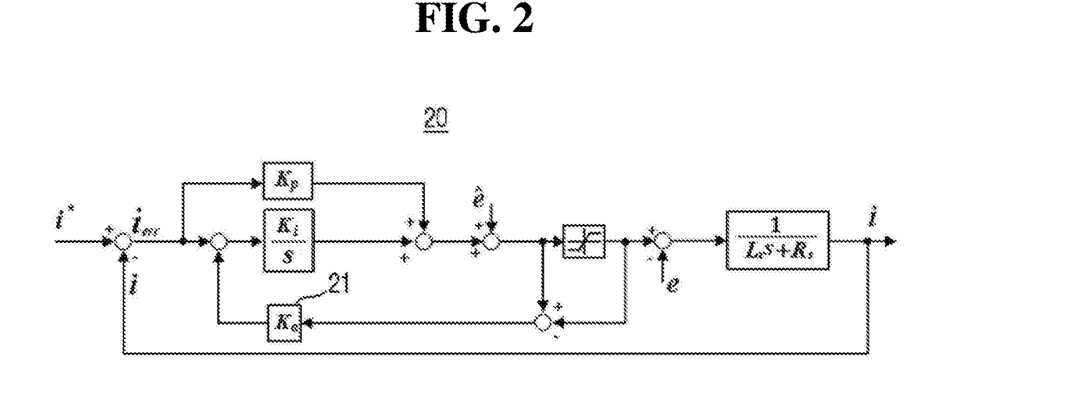
FIG. 2 is a block diagram of a current controller included in a speed control system of a multi-phase BLDC motor according to some embodiments of the present disclosure.

FIG. 2 is a block diagram of a current controller included in a speed control system of a three-phase BLDC motor according to some embodiments of the present disclosure.

Figure 3:
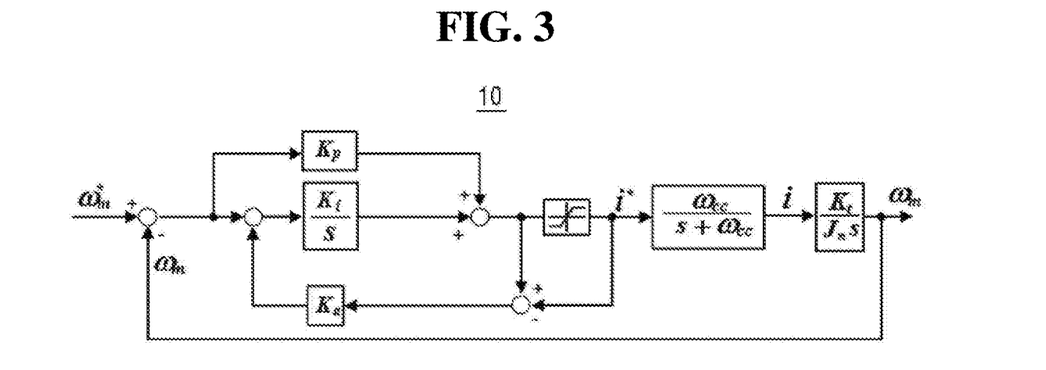
FIG. 3 is a block diagram of a speed controller included in the speed control system of the multi-phase BLDC motor according to some embodiments of the present disclosure.

The speed control system of the three-phase BLDC motor according to some embodiments of the present disclosure may include a current controller 20 and a speed controller 10 (see FIG. 3). In detail, the current controller 20 shown in FIG. 2 may be a proportional integral (PI) controller that uses, as a control input, the difference between a current command $I_{ref}$ and the maximum phase current $I_{max}$ among phase currents provided from a sensor.

The transfer function of the system except an anti-windup controller in the current controller 20 of FIG. 2 is expressed by Equation 4 below:

$$\frac{I(s)}{I_{ref}(s)} = \frac{K_{pc}s + K_{ic}}{L_s s^2 + (R_s + K_{pc})s + K_{ic}}. \quad \text{[Equation 4]}$$

Here, when gains $K_{pc}$ and $K_{ic}$ are chosen such that zeros of the current controller 20 of FIG. 2 cancel poles of the motor ($K_{pc} = L_s \omega_{cc}$, $K_{ic} = R_s \omega_{cc}$), the transfer function may be expressed as a transfer function in the form of a low-pass filter having a DC gain of 1 and a cut-off angular frequency of $\omega_{cc}$, as expressed by Equation 5-1 below:

$$\frac{I(s)}{I_{ref}(s)} = \frac{\omega_{cc}}{s + \omega_{cc}}. \quad \text{[Equation 5-1]}$$

An integrator included in the PI controller may make an output by continuously integrating errors between a previous control input and a current control input. However, when the errors are continuously accumulated in the integrator over time, the output of the current controller 20 is saturated. In this case, a wind-up may occur in which the output of the controller is not properly applied to the system.

In order to prevent the wind-up due to the error accumulation of the integrator, an anti-windup controller 21 may be added to the current controller 20. The transfer function of the current controller to which an anti-windup controller 21 with an anti-windup gain $K_{ac}$ is added may be expressed by Equation 5-2 below.

$$I(s) = \frac{K_{pc}s + K_{ic}}{L_s s^2 + (R_s + K_{pc})s + K_{ic}} \left[ I_{ref}(s) - \frac{s + K_{ac}K_{ic}}{K_{pc}s + K_{ic}}(V_s^* - V_a) \right]. \quad \text{[Equation 5-2]}$$

An anti-windup output may be determined by the rightmost term $$\frac{s + K_{ac}K_{ic}}{K_{pc}s + K_{ic}}(V_a^* - V_b)$$

in Equation 5-2. Also, the anti-windup output may be generated when a voltage command, which is an output of the current controller 20, is greater than a physical voltage limit of an inverter or when the current controller 20 (see FIG. 3) has a large frequency bandwidth at low speed.

FIG. 3 is a block diagram of a speed controller included in the speed control system of the three-phase BLDC motor according to some embodiments of the present disclosure.

Referring to FIG. 3, when the speed of the motor is controlled, the current controller is designed to be placed in the speed controller 10 as shown in FIG. 3. At this time, when the bandwidth of the speed controller 10 is chosen to be 0.1 times or less the bandwidth of the current controller, the closed-loop transfer function of a current control system in a cut-off angular frequency band of the speed controller 10 may be approximated by 1.

As the speed controller, a PI controller is generally used as in the case of current control, and a transfer function of the speed controller may be expressed by Equation 6 below:

$$G_s(s) = K_{ps} + \frac{K_{is}}{s}. \quad \text{[Equation 6]}$$

At low-speed and light-load conditions, the anti-windup output is generated in a pulse form in a control phase current switching section for the BLDC motor. At high-speed conditions, the anti-windup output converges to a constant value. By performing automatic advance angle control in a high-speed operation area, the anti-windup output may decrease. This means that a voltage headroom for controlling the motor increases as an advance angle increases.

This may be described again with reference to Equation 7 below. Equation 7 is an equation for an ideal three-phase BLDC motor.

$$V_{DC} = R_s i_a + L_s \frac{di_a}{dt} + E - \left(R_s i_b + L_s \frac{di_b}{dt} + E\right) \quad \text{[Equation 7]}$$

where $V_{DC}$ is an applied DC voltage of the BLDC motor. Assuming that electric current flows through the BLDC motor when the magnitude of a counter-electromotive force E forms a constant electric angle of 120 degrees, $i_a = -i_b$. In this case, Equation 7 may be summarized as Equation 8 below:

$$\frac{1}{2} V_{DC} = E_{max} - R_s i_a = L_s \frac{di_a}{dt} \quad \text{[Equation 8]}$$

where $E_{max}$ is a counter-electromotive force that has the maximum magnitude in a section of an electric angle of 120 degrees. In Equation 8, a voltage drop component due to inductance is defined as a voltage headroom $V_{eff}$ since it can limit the counter-electromotive force of the motor.

Figure 4:
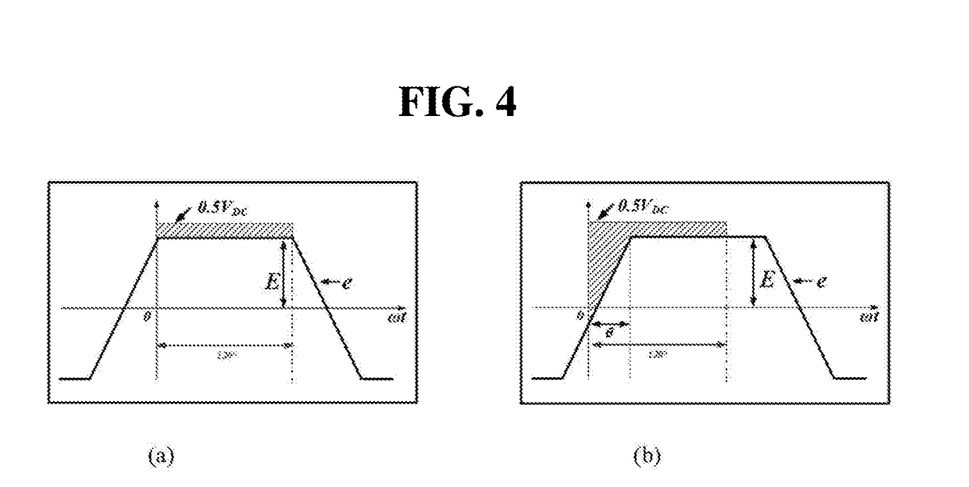
FIG. 4 shows graphs illustrating operation of the BLDC motor.

FIG. 4 shows graphs illustrating operation of the BLDC motor.

Referring to FIG. 4, the voltage headroom $V_{eff}$ may be shown in FIGS. 4(a) and 4(b) in i) the case in which the automatic advance angle control is not performed and ii) the case in which the automatic advance angle control is performed. That is, the voltage graph of the case where the automatic advance angle control is not performed (FIG. 4(a)) because the anti-windup output has a smaller magnitude than the voltage headroom and the voltage graph of the case where the automatic advance angle control is performed (FIG. 4(b)) because the anti-windup output is generated as much as the voltage headroom are shown in FIG. 4.

These graphs are expressed by parts (a) and (b) of Equation 9 below. That is, the areas of the hatched regions in the two graphs represent the magnitude of the voltage headroom $V_{eff}$.

[Equation 9]

$$\text{(a) } V_{eff} = \frac{1}{2} V_{DC} - E_{max} - R_s i_a$$

$$\text{(b) } V_{eff} = \left(\frac{1}{2} V_{DC} - E_{max} - R_s i_a\right) + \frac{\pi}{3} \Theta_0 \left(\frac{3 E_{max}}{\pi} \Theta_0 + E_{max} - R_s i_a\right)$$

Figure 5:
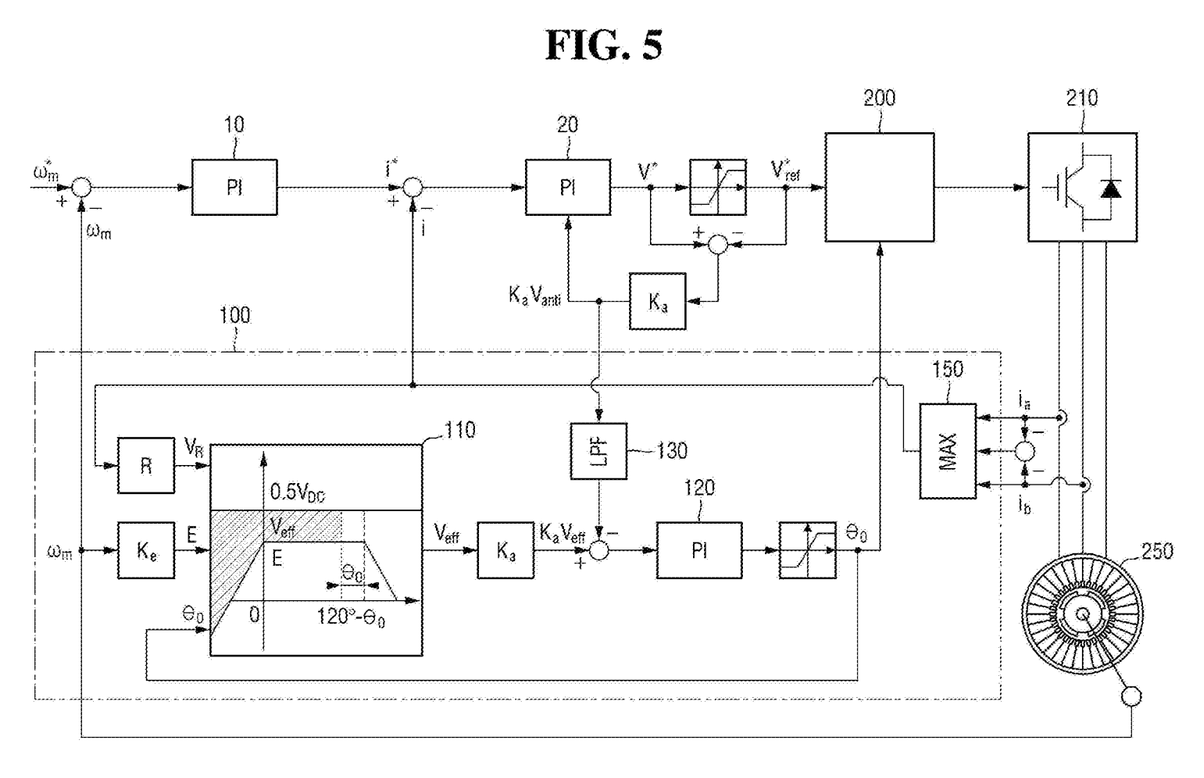
FIG. 5 is a block diagram illustrating an automatic advance angle control system of the BLDC motor according to an embodiment of the present disclosure.

FIG. 5 is a block diagram illustrating an automatic advance angle control system of the BLDC motor according to some embodiments of the present disclosure.

Referring to FIG. 5, the automatic advance angle control system of the BLDC motor according to the present disclosure may include a speed controller 10, a current controller 20, a voltage headroom calculator 110, an advance angle controller 120, a low-pass filter 130, a current meter 150, etc.

The current controller 20 and the speed controller 10 are the same as the current controller and the speed controller that have been described with reference to FIGS. 2 and 3, respectively, and thus a detailed description thereof will be omitted.

The automatic advance angle control system of the BLDC motor according to an embodiment of the present disclosure may control an advance angle using anti-windup of the current controller 20 and the voltage headroom of the BLDC motor 250. In detail, the system computes a necessary advance angle by comparing an anti-windup feedback voltage $V_{anti}$ of the current controller 20 and the voltage headroom $V_{eff}$ calculated by the voltage headroom calculator 110.

In detail, the system does not generate an advance angle $\theta_0$ necessary for the automatic advance angle control when the anti-windup voltage $V_{anti}$ of the current controller 20 has a smaller magnitude than the voltage headroom $V_{eff}$ and generates the advance angle $\theta_0$ necessary for the automatic advance angle control when the anti-windup voltage $V_{anti}$ is equal to the voltage headroom $V_{eff}$.

The voltage headroom calculator 110 may calculate the voltage headroom $V_{eff}$, which is an actual voltage applied to the motor. The voltage headroom calculator 110 may calculate a voltage headroom on the basis of a motor current $i_a$ provided from the current meter 150, an angular speed $\omega_m$ measured from a hall sensor of the BLDC motor 250, and the like.

In some embodiments of the present disclosure, the voltage headroom calculator 110 may calculate the voltage headroom $V_{eff}$ through the above calculation process of Equation 9. That is, the voltage headroom calculator 110 may calculate the voltage headroom $V_{eff}$ for each of i) the case where the automatic advance angle control is performed and ii) the case where the automatic advance angle control is not performed. When the automatic advance angle control is performed, the voltage headroom calculator 110 may receive feedback of an advance angle $\theta_0$ output from the advance angle controller 120 and may use the advance angle $\theta_0$ to calculate the voltage headroom $V_{eff}$.

The voltage headroom $V_{eff}$ provided from the voltage headroom calculator 110 may be multiplied by an anti-windup gain $K_a$ and then may be provided to the advance angle controller 120.

The current controller 20 may output a voltage command to drive the BLDC motor 250, as described above. Also, by the term $$\frac{s + K_{ac}K_{ic}}{K_{pc}s + K_{ic}}(V_a^* - V_a)$$

in Equation 5, which represents a transfer function indicating the output of the current controller 20, the anti-windup output $V_{anti}$ may be determined and then provided to the low-pass filter 130. The anti-windup output provided to the low-pass filter 130 may be multiplied by the anti-windup gain $K_a$.

The low-pass filter 130 may receive and filter the anti-windup gain $K_a$. In some embodiments of the present disclosure, the anti-windup output $K_a V_{anti}$ may be generated in a pulse form when the BLDC motor 250 operates at low-speed and light-load conditions and may converge to a certain value when the BLDC motor 250 operates at high speed. By filtering the anti-windup output $K_a V_{anti}$, the low-pass filter 130 may remove the pulse component of the anti-windup output corresponding to low speed and smooth the anti-windup output corresponding to high speed and then may provide the anti-windup output to the advance angle controller 120.

The advance angle controller 120 may receive the voltage headroom and the anti-windup output and determine the advance angle $\theta_0$. The determined advance angle $\theta_0$ is provided to a PWM 210 through an output module 200 in the form of a phase-shifted phase current.

The advance angle controller 120 may compare the provided voltage headroom and the anti-windup output and perform PI control using a difference between the voltage headroom and the anti-windup output as an input to generate the advance angle $\theta_0$.

In FIG. 5, the BLDC motor 250 and the circuit connected thereto are shown as a three-phase motor, but the present disclosure is not limited thereto. It will be obvious to those skilled in the art that the automatic advance angle control system of the present disclosure may include a BLDC motor 250 composed of a multi-phase motor other than a three-phase motor and a circuit connected thereto.

Figure 6:
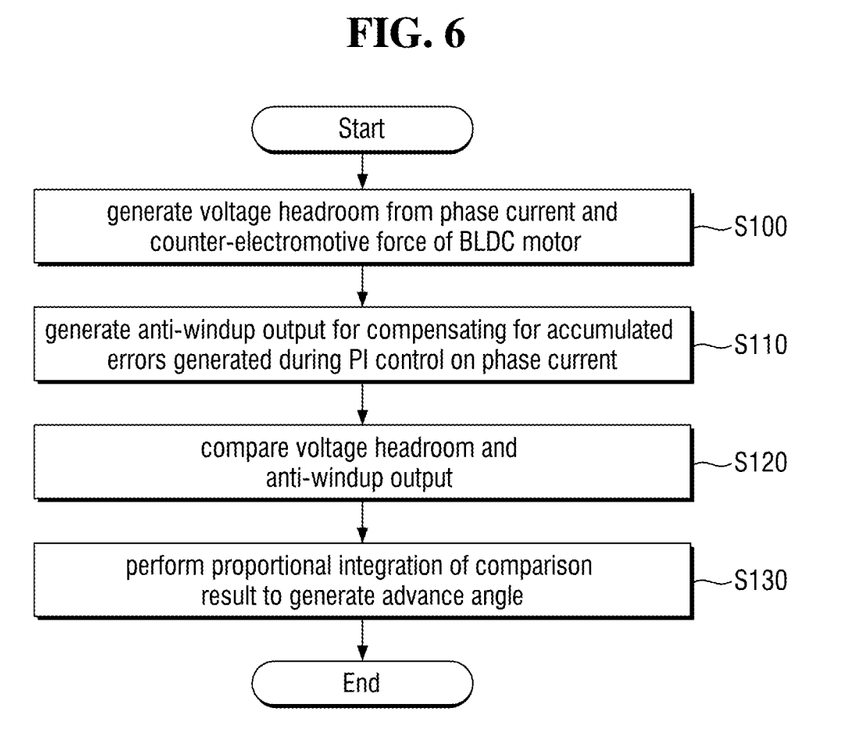
FIG. 6 is a flowchart illustrating an automatic advance angle control method for the BLDC motor according to an embodiment of the present disclosure.

FIG. 6 is a flowchart illustrating an automatic advance angle control method for the BLDC motor according to an embodiment of the present disclosure.

Referring to FIG. 6, first, a phase current and a counter-electromotive force provided to the BLDC motor 250 is received and a voltage headroom $V_{eff}$ is generated (S100).

In detail, the BLDC motor 250 generates a voltage headroom $V_{eff}$ using any one of phase currents $i_a$ and $i_b$ provided to the BLDC motor 250 and a counter-electromotive force E. The above-described calculation process of Equation 9 may be utilized to generate the voltage headroom $V_{eff}$. For subsequent calculation processes, the voltage headroom $V_{eff}$ may be multiplied by a gain $K_a$.

Next, an anti-windup output $V_{anti}$ is generated for compensating for accumulated errors of the BLDC motor 250 (S110).

The anti-windup output $V_{anti}$ may be generated from a difference between an output voltage $V^*$ for current control and a reference voltage $V^*$ref generated by passing the output voltage $V^*$ through a limiter. Also, for a subsequent calculation process, the anti-windup output $V_{anti}$ may be multiplied by a gain $K_a$.

In some embodiments, the anti-windup output $V_{anti}$ may be low-pass filtered to remove pulse components in low-frequency bands, but the present disclosure is not limited thereto.

Next, the voltage headroom $V_{eff}$ and the anti-windup output $V_{anti}$ are compared (S120).

As described above, when the voltage headroom $V_{eff}$ is higher than the anti-windup output $V_{anti}$, the advance angle control is necessary. Accordingly, a difference between the voltage headroom $V_{eff}$ and the anti-windup output $V_{anti}$ is generated and the generated difference is provided to generate an advance angle $\theta_0$.

Last, the BLDC motor 250 performs a proportional integration on a result of comparing the voltage headroom $V_{eff}$ and the anti-windup output $V_{anti}$ and generates the advance angle $\theta_0$ (S130).

The generated advance angle $\theta_0$ may be provided to shift the phase of the phase current $i_a$ or $i_b$.

Figure 7:
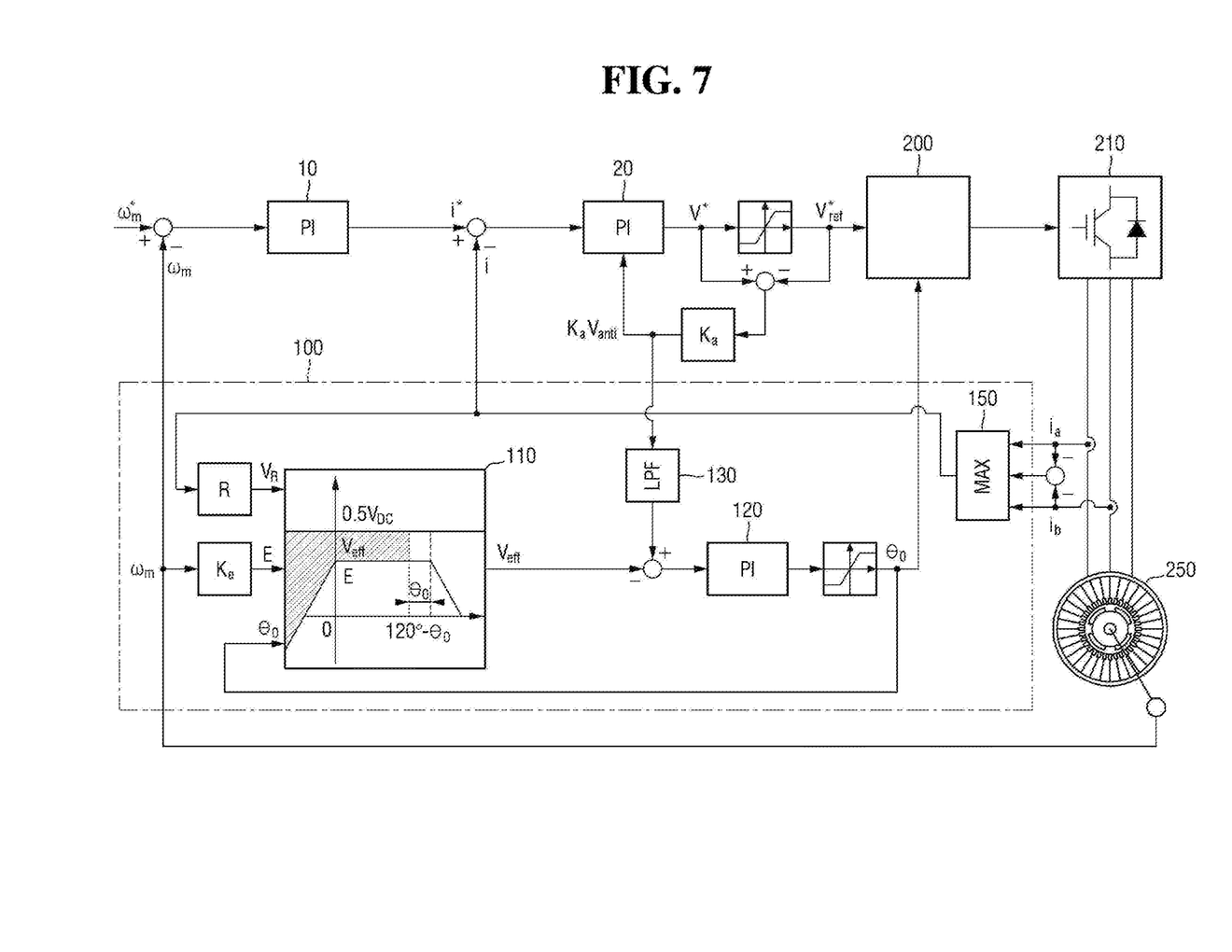
FIG. 7 is a block diagram illustrating an automatic advance angle control system of the BLDC motor according to some embodiments of the present disclosure.

FIG. 7 is a block diagram illustrating an automatic advance angle control system of the BLDC motor according to some embodiments of the present disclosure.

The automatic advance angle control system of the BLDC motor in FIG. 7 may be different from the system of FIG. 5. The system of FIG. 5 generates the advance angle $\theta_0$ to perform the automatic advance angle control when an anti-windup output $V_{anti}$ is generated and then becomes equal in magnitude to a voltage headroom $V_{eff}$. On the contrary, the system of FIG. 7 automatically generates an advance angle $\theta_0$—to automatically perform the automatic advance angle control when an anti-windup output $V_{anti}$ is generated. This will be described in more detail with reference to the graphs of FIGS. 8A and 8B.

Figure 8A:
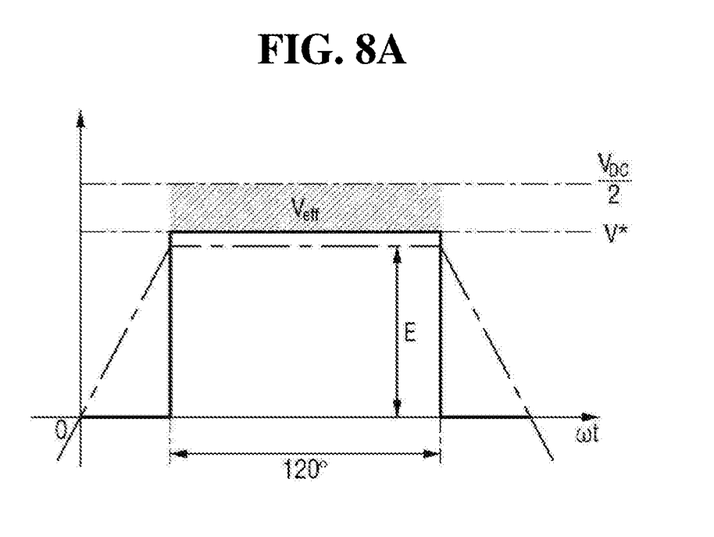
FIGS. 8A and 8B are graphs illustrating operation of the automatic advance angle control system of the BLDC motor according to some embodiments of the present disclosure.
Figure 8B:
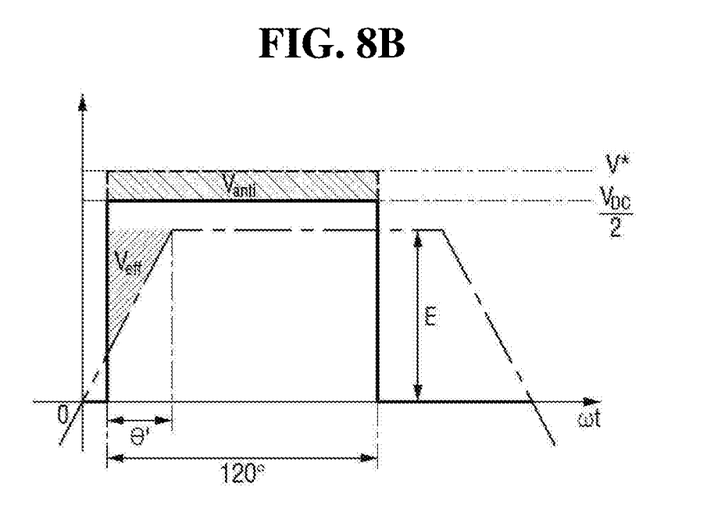

FIGS. 8A and 8B are graphs illustrating operation of the automatic advance angle control system of the BLDC motor according to some embodiments of the present disclosure.

First, referring to FIG. 8A, a voltage graph corresponding to a case where a voltage limit $0.5V_{DC}$ of an inverter, which is half an applied DC voltage of the BLDC motor, is higher than an output voltage $V^*$ output as a voltage command of the current controller 20 is shown. This indicates a case where no anti-windup output $V_{anti}$ is generated, that is, a case where an advance angle $\theta'$ applied to the BLDC motor is 0.

The voltage headroom $V_{eff}$ is equal to the area of a difference section between the voltage limit $0.5V_{DC}$ of the inverter and the output voltage $V^*$, which is shown in the graph of FIG. 8A and may be expressed by Equation 10 below:

$$V_{eff} = \left(\frac{V_{DC}}{2} - V^*\right)\frac{2}{3}\pi + \frac{3}{\pi}(\theta')^2 \qquad \text{[Equation 10]}$$

where the output voltage $V^*$ is equal to $$E + Ri + Ls\frac{di}{dt}.$$

Therefore, Equation 10 may be rewritten as follows:

$$V_{eff} = \left(\frac{V_{DC}}{2} - E - Ri - Ls\frac{di}{dt}\right)\frac{2}{3}\pi + \frac{3}{\pi}(\theta')^2. \qquad \text{[Equation 11]}$$

Here, since the advance angle θ' is 0, the voltage headroom $V_{eff}$ may be expressed on by the left term, i.e., $$V_{eff} = \left(\frac{V_{DC}}{2} - E - Ri - Ls\frac{di}{dt}\right)\frac{2}{3}\pi.$$

Referring to FIG. 8b, a voltage graph corresponding to a case where the output voltage V* is higher than the applied voltage $0.5V_{DC}$ of the BLDC motor is shown. In this case, an anti-windup output $V_{anti}$ is generated to compensate for the insufficient applied voltage $0.5V_{DC}$ of the BLDC motor. With the generation of the anti-windup output $V_{anti}$, the advance angle θ' may be generated based on a difference between the anti-windup output $V_{anti}$ and the voltage headroom $V_{eff}$.

In FIG. 8B, the magnitude of the voltage headroom $V_{eff}$ is equal to the area of the difference section between the output voltage V* and the voltage limit $0.5V_{DC}$ of the inverter, that is, Equation 11. However, the voltage limit $0.5V_{DC}$ of the inverter is equal to the sum of a voltage loss $$R_i + L_s\frac{di}{dt}$$

and the counter-electromotive force E shown in FIG. 8B. Therefore, Equation 11, which is for expressing the voltage headroom $V_{eff}$ of FIG. 8B may be rewritten as Equation 12 below:

$$V_{eff} = \frac{3}{\pi}(\theta')^2. \quad [\text{Equation 12}]$$

As a result, as shown in FIG. 8B, only when the anti-windup output $V_{anti}$ is generated, advance angle control is performed using the advance angle θ', and the voltage headroom $V_{eff}$ generated using the advance angle θ' compensates for the anti-windup output $V_{anti}$.

Referring to FIG. 7 again. $K_a V_{anti}$, which is the product of the anti-windup output having passed through the low-pass filter 130 and the gain $K_a$, may be compared to the voltage headroom $V_{eff}$ generated from the voltage headroom calculator 110.

That is, in this embodiment, whether the anti-windup output $V_{anti}$ is generated is used as a command for determining whether to generate the advance angle $\theta_0$, as described with reference to FIGS. 8A and 8B.

In detail, the advance angle controller 120 may generate the advance angle $\theta_0$ using a command indicating whether the anti-windup output $V_{anti}$ is generated, independently of the magnitude relationship between the anti-windup output $K_a V_{anti}$ and the voltage headroom $V_{eff}$. The advance angle controller 120 may generate the advance angle $\theta_0$ by comparing the anti-windup output $K_a V_{anti}$ and the voltage headroom $V_{eff}$ and performing PI control using the anti-windup output minus the voltage headroom as an input.

When the anti-windup output $V_{anti}$ is not generated, an input for generating the advance angle $\theta_0$, i.e., the anti-windup output $V_{anti}$ is 0. Thus, the advance angle controller 120 does not generate the advance angle $\theta_0$, and thus does not perform the advance angle control.

Figure 9:
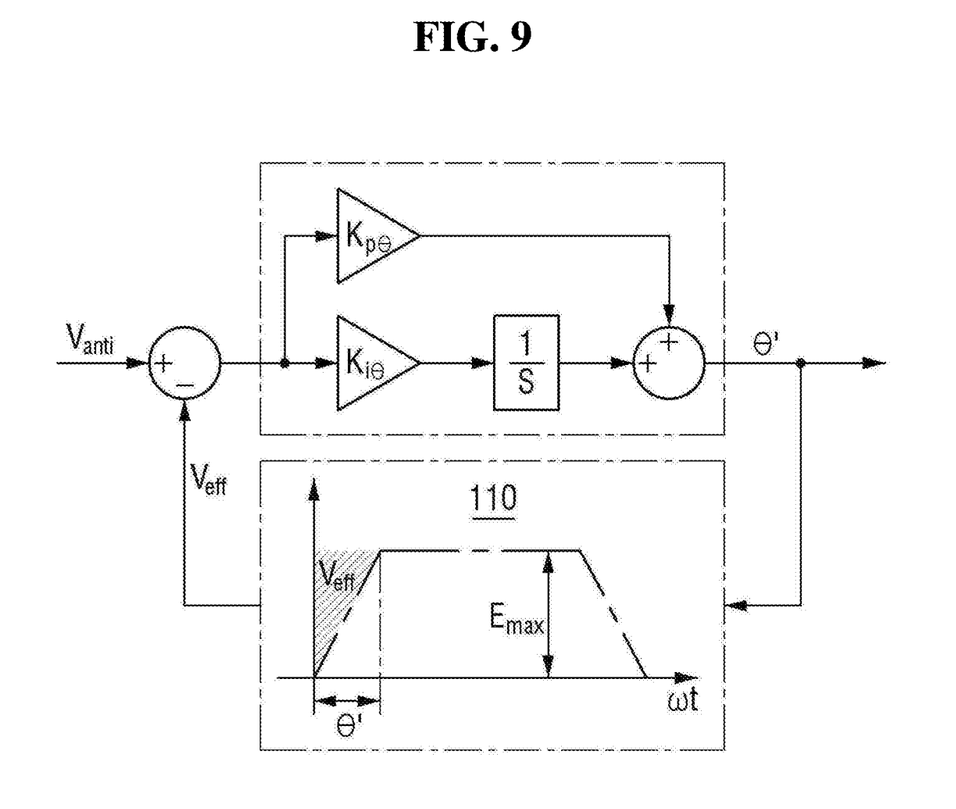
FIG. 9 is a block diagram illustrating an advance angle controller of FIG. 7.

FIG. 9 is a block diagram illustrating the advance angle controller of FIG. 7.

Referring to FIG. 9, the advance angle controller may be configured in the form of a PI controller composed of the sum of a term proportional to a control input of a transfer function (by a control gain $K_p$) and a term generating an output from integration (by a control grain $K_i$).

The advance angle θ' generated as the output of the advance angle controller is provided as an input of the voltage headroom calculator 110 in the form of a feedback input, and the voltage headroom calculator 110 may generate the voltage headroom $V_{eff}$ on the basis of the advance angle θ', as expressed in Equation 12.

The advance angle control system of the BLDC motor according to embodiments of the present disclosure does not use an existing lookup table or additional hardware to perform advance angle control. Accordingly, there is no delay in response of speed control due to the use of a lookup table, or there is no need to prepare a lookup table for each motor. Also, there is no need to check time constants due to additional hardware, or there is a low risk of noise occurrence.

The advantageous effects of the present disclosure are not limited to the above-described effects, and other advantageous effects not specifically mentioned herein can be apparently understood by those skilled in the art from the description of following claims.

Terms such as "controller," "calculator," or "module," used herein refer to a software component or a hardware component such as a field-programmable gate array (FPGA) or an application-specific integrated circuit (ASIC), and the "controller," "calculator," or "module" performs a specific function. However, the terms such as "controller," "calculator," or "module" are not limited to software or hardware. The "controller," "calculator." or "module" may be configured to be in an addressable storage medium or may be configured to operate one or more processors. Accordingly, for example, the "controller," "calculator," or "module" may include components, such as software components, object-oriented software components, class components, and task components, processes, functions, attributes, procedures, subroutines, segments of a program code, drivers, firmware, a micro code, a circuit, data, a database, data structures, tables, arrays, and variables. A function provided by the components may be combined with a smaller number of components or may be divided into additional components.

Exemplary embodiments of the present disclosure have been described with reference to the accompanying drawings, but the present disclosure is not limited to the embodiments and may be prepared in various forms, and it will be understood by a person with ordinary skill in the art, to which the present disclosure pertains, that the embodiments of the present disclosure may be implemented in other specific forms without modifying the technical spirit or essential features of the present disclosure. The above embodiments are accordingly to be regarded as illustrative rather than restrictive.

What is claimed is:

1. An automatic advance angle control method for a brushless linear direct current (BLDC) motor, the automatic advance angle control method comprising:
  receiving a phase current and a counter-electromotive force provided to the BLDC motor and generating a voltage headroom;
  monitoring whether an anti-windup output is generated to compensate for accumulated errors of the BLDC motor; and generating an advance angle according to a command indicating whether the anti-windup output is generated when the anti-windup output is generated, wherein the advance angle is generated by using the anti-windup output minus the voltage headroom as an input of an advance angle controller and independently of a magnitude relationship between the voltage headroom and the anti-windup output, wherein the advance angle is not generated when the anti-windup output is not generated.

2. The automatic advance angle control method of claim 1, further comprising controlling a phase of the phase current using the advance angle, wherein the voltage headroom ($V_{eff}$) is determined by the following equation:

$$\text{(a) } V_{eff} = \left(\frac{V_{DC}}{2} - E - Ri - Ls\frac{di}{dt}\right)\frac{2}{3}\pi$$

$$\text{(b) } V_{eff} = \frac{3}{\pi}(\theta')^2$$

where (a) is a case in which advance angle control is not performed, and (b) is a case in which advance angle control is performed.

3. The automatic advance angle control method of claim 1, wherein the BLDC motor includes a multi-phase BLDC motor.

4. An automatic advance angle control system for a brushless linear direct current (BLDC) motor, the automatic advance angle control system comprising:

a current controller configured to generate an anti-windup output for compensating for accumulated errors of an output voltage provided to the BLDC motor;

a voltage headroom calculator configured to generate a voltage headroom from a counter-electromotive force and the output voltage provided to the BLDC motor; and an advance angle controller configured to generate an advance angle for controlling a phase of a phase current of the BLDC motor according to a command indicating whether the anti-windup output is generated when the anti-windup output is generated, wherein the advance angle is generated by using the anti-windup output minus the voltage headroom as an input of the advance angle controller and independently of a magnitude relationship between the voltage headroom and the anti-windup output, wherein the advance angle is not generated when the anti-windup output is not generated.

5. The automatic advance angle control system of claim 4, wherein advance angle control is performed using the advance angle when the anti-windup output is generated, a voltage headroom generated using the advance angle compensates for the anti-windup output, and the voltage headroom ($V_{eff}$) is determined using the following equation:

$$\text{(a) } V_{eff} = \left(\frac{V_{DC}}{2} - E - Ri - Ls\frac{di}{dt}\right)\frac{2}{3}\pi$$

$$\text{(b) } V_{eff} = \frac{3}{\pi}(\theta')^2$$

where (a) is a case in which advance angle control is not performed, and (b) is a case in which advance angle control is performed.

6. The automatic advance angle control system of claim 4, wherein the BLDC motor includes a multi-phase BLDC motor.

* * * * *